United States Patent Office 3,129,249
Patented Apr. 14, 1964

3,129,249
PROCESS FOR THE PRODUCTION
OF BORON ARYLS
Roland Köster, Mülheim (Ruhr), Germany, assignor to Studiengesellschaft Kohle m.b.H., Mülheim (Ruhr), Germany
No Drawing. Filed Jan. 16, 1961, Ser. No. 82,697
Claims priority, application Germany Jan. 19, 1960
14 Claims. (Cl. 260—606.5)

This invention relates to the production of boron aryls.

Boron aryls have so far been prepared almost exclusively by reacting boron halides or boric acid esters with suitable metal aryls (for example Grignard compounds, alkali aryls). It has not yet been possible to prepare boron triaryls without using metal compounds. It is indeed true that arylation of boron is obtained by reacting boron trichloride with benzene but this reaction, which takes place in the presence of metal catalysts (aluminium or aluminium chloride), only yields phenyl boron dichloride (see J. Amer. Chem. Soc. 81 2597 (1959)), that is an incompletely arylated boron compound.

The processes referred to above have various disadvantages. In the first place, they require the use of compounds which are costly to prepare (for example metal aryls), and secondly arylation of the boron is incomplete. The latter disadvantage is also the case with a method which describes the production of boron aryl compounds from diborane and benzene (see J. Amer. Chem. Soc. 70 2053 (1948)). The yield of monophenyl boric acid, which in this case can be isolated as the sole arylation product, is very small, so that this method is not suitable as a process for the production of boron phenyl compounds on an industrial scale.

It has now surprisingly been found according to the invention that boron aryls, such as boron triphenyl, can be prepared very readily and with good yields by the reaction of aromatic hydrocarbons, in particular benzene, naphthalene, and benzene substituted with only methyl substituents, such as toluene and xylene, with such boron compounds as include within their structure both B-C and B-H bonds or a compound or mixture convertible thereto, such as boron hydride compounds in the presence of boron alkyls. As boron compounds particularly suitable for the process according to the invention may be mentioned for example alkylated diboranes of the general formula $B_2R_xH_y$ (in which R is an alkyl group, the sum of $x$ and $y=6$ and $x=1$ to 4) since these contain both the boron-hydrogen bonds necessary for the reaction and the boron-carbon bonds which are also necessary.

For example, if tetraethyl diborane is heated together with excess benzene to temperatures above 140° C., boron triphenyl is formed as well as ethane and hydrogen in accordance with the equation:

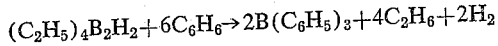

The ethyl diborane can also be replaced if desired by other ethyl diboranes with higher alkyl radicals. It is also possible to employ boron trialkyls directly which, in the presence of aromatic hydrocarbons, are first of all converted with hydrogen to form alkyl diboranes. (See U.S.-specification No. 641,246.) Finally, boron aryls can also be successfully prepared from aromatic hydrocarbons and N-trialkyl borazanes in the presence of boron alkyls.

The effect achieved by the presence of the boron alkyl compounds is substantially to remove the hydrogen formed by arylation of the boron from the system and thereby to reduce decomposition of the boron aryl compounds by combination with hydrogen. As the phenyl groups already formed by combination tend to react with boron hydride compounds with the formation of more highly boronated aromatic compounds it is advantageous to use a large excess of the aromatic hydrocarbon when preparing boron triaryls by the process according to the invention. By adopting this measure, that is by using dilute solutions (boron equivalent/aromatic hydrocarbon of for example=1:50 to 1:60) between 80 and 90% of the boron compounds are utilized in the formation of boron aryl, there being practically no formation of by-product. The boron hydride and boron alkyl compounds not reacted in the reaction according to the invention can easily be recovered and used again for the arylation process. The boron triaryls prepared according to the process invention may be obtained directly in pure form after the volatile constituents have been removed for example by distillation.

The process according to the invention must be carried out in the absence of air and moisture, since both the starting materials and the materials which can be produced according to the invention react with air or moisture. The aromatic hydrocarbons must be suitably purified before use in the process of the present invention.

The process according to the invention is preferably carried out at temperatures between 150° and about 450° C.

The process according to the invention may, if desired, be carried out continuously, in which case it is preferred to effect the reaction in a reactor heated to 180–200° C., and to provide means for the continuous evaporation of readily volatile by-products of the reaction such as unreacted alkyl diboranes, boron alkyls and aromatic hydrocarbons and thereby to separate them from the less readily volatile boron aryls.

The boron aryls which may be prepared according to the invention are particularly suitable as starting materials for organic synthesis reactions (for example for the preparation of aluminium triaryls, sodium borotetraphenyl etc.).

In order that the invention may be more fully understood, the following examples are given by way of illustration only.

Example 1

15.45 g. (0.11 mol) of tetraethyl diborane and 305 g. (3.91 mol) of absolute benzene are heated in a 0.5 litre autoclave in the absence of air and moisture for 5 hours to 180° C., the pressure rising to about 20 atm. After cooling and separating the gases which have formed (2.8 litres, consisting of 37.5% $H_2$, 54% $C_2H_6$, 7% $C_3H_8$ and some $CH_4$ and $C_4H_{10}$), benzene, boron, triethyl and ethyl diboranes are distilled off from the reaction mixture, which is light yellow in colour. The residue (about 8 g.) then crystallises immediately (melting point between 120 and 130° C.; analysis: 4.15% B and 92% $C_6H_5$). By subsequent distillation under reduced pressure, 6.5 g. of boron triphenyl (M.P. =150–151° C.) are obtained.

Example 2

8 g. of N-triethyl borazane are dissolved with 28 g. of boron tripropyl in 400 g. of benzene. The solution is heated for 8 hours in an autoclave to 200° C., the pressure rising to about 10 atmospheres. After cooling and separating out the gas which has formed (propane), benzene, excess boron tripropyl and some unreacted N-triethyl borazane are distilled off from the solution, which is slightly yellow in colour. A total of 5 g. of boron triphenyl with a melting point of 150° C. (after sublimation) is obtained from the residue.

Example 3

A mixture of 200 g. of boron triisobutyl, 10 g. of diborane and 3.2 g. of dry and air-free benzene is conducted over a period of about 20 minutes in vapour form through a tube reactor heated to 300° C. (length of reactor 18 metres, internal diameter=5 mm., wall thickness=0.5 mm.). The residence time is about 10 seconds with a pressure of 20 atmospheres in the reactor. 18 litres of hydrogen are obtained as well as 30 g. of isobutane. The colourless liquid is distilled. After separating out the benzene and boron triisobutyl, 80 g. of boron triphenyl are obtained. After sublimation, the compound melts at 150–151° C.

Example 4

98 g. of tetrapropyl diborane in admixture with 2.5 kg. of benzene are led through the reactor described in Example 3, which is heated to 320° C. As well as 20 g. of $C_3$-hydrocarbons (propane and a small quantity of propene) and 12 litres of hydrogen, a benzene solution of boron triphenyl is obtained from which 30 g. of crystallised boron triphenyl are recovered after the solvent has been distilled off.

Example 5

By the procedure of Example 1, there is obtained, by reaction of 17 g. of tetraethyl diborane and 400 g. of dry and air-free toluene with subsequent separation of the gases which are formed (3.2 litres consisting of 40% hydrogen, 55% ethane, the remainder being propane as well as a very small quantity of methane and n-butane), and distillation off of the toluene, boron triethyl and a small quantity of unreacted ethyl diborane, a non-crystalline residue amounting to 7 g. The boron content (determined by the sublimate method as disclosed in Liebigs Ann. Chem. 563, 120 (1949)), is 3.7%; calculated for $B(C_7H_7)_3=3.80\%$. The material is an isomeric mixture of the different boron tritolyl compounds.

Example 6

A mixture of 500 g. of p-xylene and 20 g. of tripropyl diborane is heated in a 1 litre autoclave for 5½ hours to 190° C., the pressure rising to about 35 atmospheres. The autoclave is allowed to cool and after blowing off the gases which have formed (4.5 litres consisting of 48% propane and 52% hydrogen), a slightly yellowish liquid is obtained, from which a crystallised residue is obtained after distilling off the p-xylene. Distillation (B.P.$_1$=100–185° C.) leads to a compound with the melting point of 152–153° C. (boron tri-p-xylyl).

Example 7

A mixture of 500 g. of naphthalene and 20 g. of boron isobutyl (15 g. of tetraisobutyl diborane and 5 g. of boron triisobutyl) is heated in a 1 litre flask for 12 hours to 220–240° C. 2.5 litres of hydrogen are evolved and 3 g. of isobutene are split off. During heating, the solution becomes slightly yellowish in colour. The naphthalene and unreacted boron isobutyl compounds are then distilled off under reduced pressure. A yellowish brown crystalline mass is obtained as residue, which can be recrystallised from ether (indefinite melting point between 190 and 210° C.). A mixture of different isomeric tri-naphthylboron compounds ($\alpha$ and $\beta$) is obtained. Found: B, 2.71%, calculated for $B(C_{10}H_7)_3$=B: 2.75%.

What I claim is:

1. The process for preparing boron aryls, which consists essentially of reacting a member selected from the group consisting of mixtures of N-trialkyl borazanes and boron alkyls, alkylated boron hydrides, mixtures of boron trialkyl and hydrogen, and mixtures of boron hydrides and boron alkyls with a substantially pure aromatic hydrocarbon selected from the group consisting of benzene, naphthalene, and benzene substituted with only methyl substituents, under moisture-free and air-free conditions, at a temperature between about 150 and 450° C. and recovering the boron aryl thereby formed.

2. Process according to claim 1, in which said alkylated boron hydride has the formula $B_2R_xH_y$ wherein R is an alkyl radical, the sum of $x+y$ is equal to 6, and $x$ is an integer of from 1 to 4.

3. Process according to claim 1, wherein said substantially pure aromatic hydrocarbon is used in great excess.

4. Process according to claim 1, wherein said reaction is effected at a temperature between 180 and 200° C.

5. Process according to claim 1, which comprises effecting said reaction continuously at a temperature between about 180 and 200° C. and continuously removing by evaporation the readily volatile by-products formed in said reaction.

6. Process according to claim 1, wherein said boron compound group member is tetraethyldiborane and said aromatic hydrocarbon is benzene.

7. Process according to claim 1, wherein said boron compound group member is a mixture of N-triethyl borazane and boron tripropyl and said aromatic hydrocarbon is benzene.

8. Process according to claim 1, wherein said boron compound group member is a mixture of boron tri-isobutyl and diborane and said aromatic hydrocarbon is benzene.

9. Process according to claim 1, wherein said boron compound group member is tetrapropyldiborane and said aromatic hydrocarbon is benzene.

10. Process according to claim 1, wherein said boron compound group member is tetraethyldiborane and said aromatic hydrocarbon is toluene.

11. Process according to claim 1, wherein said boron compound group member is tripropyl diborane and said aromatic hydrocarbon is p-xylene.

12. Process according to claim 1, wherein said boron compound group member is a mixture of tetraisobutyldiborane and boron tri-isobutyl and said aromatic hydrocarbon is naphthalene.

13. A process according to claim 1, in which said substantially pure aromatic hydrocarbon is toluene.

14. A process according to claim in which said substantially pure aromatic hydrocarbon is xylene.

References Cited in the file of this patent

UNITED STATES PATENTS 2,938,926    Goller et al.    May 31, 1960

FOREIGN PATENTS 558,170    Belgium    Dec. 6, 1957

OTHER REFERENCES

Hurd: J. Am. Chem. Soc., vol. 70, pp. 2053–5 (1948).

UNITED STATES PATENT OFFICE
CERTIFICATE OF CORRECTION

Patent No. 3,129,249  April 14, 1964

Roland Köster

It is hereby certified that error appears in the above numbered patent requiring correction and that the said Letters Patent should read as corrected below.

In the grant, line 1, and in the heading to the printed specification, line 4, for "Roland Koster", each occurrence, read -- Roland Köster --; column 3, line 35, for "3.7%" read -- 3.76% --; column 4, line 53, for "claim" read -- claim 1 --.

Signed and sealed this 28th day of July 1964.

(SEAL)

Attest:

ESTON G. JOHNSON
Attesting Officer

EDWARD J. BRENNER
Commissioner of Patents